United States Patent Office 2,911,439
Patented Nov. 3, 1959

2,911,439
4-CHLOROBENZYLSULFONYL FLUORIDE

Richard W. Meikle, Newport Beach, Calif., assignor to The Dow Chemical Company, Midland, Mich., a corporation of Delaware No Drawing. Application September 6, 1957
Serial No. 682,280

1 Claim. (Cl. 260—543)

The present invention relates to 4-chlorobenzylsulfonyl fluoride. The new compound is characterized by the formula

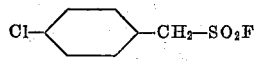

This compound is a crystalline solid somewhat soluble in many organic solvents and of low solubility in water. The compound is useful as a parasiticide and is adapted to be employed in dust and liquid compositions for the control of soil-dwelling fungi and nematodes such as *Fusarium oxysporum lycopersici, Rhizoctonia solani, Meloidogyne spp.*, and the like.

The new compound may be prepared by causing a reaction to take place between 4-chlorobenzylsulfonyl chloride and an alkali metal fluoride. Alternatively, the reaction may be carried out in the presence of an inert organic solvent such as benzene, toluene, xylene, or water. The reaction proceeds smoothly at from room temperature to the boiling temperature of the solvent. Good results are obtained when alkali metal fluoride is used in slight excess. The term alkali metal is employed in the present specification and claims to refer to sodium and potassium.

In carrying out the reaction, the 4-chlorobenzylsulfonyl chloride, potassium fluoride, and solvent, if employed, are mixed or otherwise blended together and the resulting mixture heated to the boiling temperature and under reflux for a period of time to obtain the desired 4-chlorobenzylsulfonyl fluoride and potassium chloride by-product. The reaction is preferably carried out in the presence of a small amount of added water. During the reaction a solid oftentimes precipitates in the reaction mixture. Upon completion of the heating period as evidenced by the substantial cessation of formation of precipitate, the contents are cooled to room temperature and the reaction mixture is diluted with water to dissolve the precipitated potassium chloride. The cooled aqueous mixture is solvent extracted, the extract washed with water, dried and the solvent removed by distillation at atmospheric or reduced pressure to obtain the desired product as a crystalline solid residue. The product may be purified by recrystallization from a suitable solvent such an aqueous alcohol mixture.

The following example is illustrative of the present invention but is not to be construed as limiting the same.

In a representative operation, 18.6 grams (0.083 mole) of 4-chlorobenzylsulfonyl chloride, 9.65 grams (0.166 mole) of potassium fluoride, 11 milliliters of water and 50 milliliters of xylene were heated at the boiling temperature and under reflux, 139° C., for three hours. The reaction mixture was then cooled to room temperature and diluted with 50 milliliters of water to dissolve the potassium chloride of reaction. The resulting mixture was then extracted with ether, the ether extract washed with water and dried over anhydrous sodium sulfate. The dried ether extract was warmed to vaporize the ether and recover a 4-chlorobenzylsulfonyl fluoride product as a crystalline solid residue. The fluoride product was washed with petroleum ether, dried, and found to melt at 137–139° C.

The compound of the present invention has been tested and found to be effective as a parasiticide, i.e. for the killing of soil-dwelling fungi and nematodes. For such use the product may be dispersed on an inert finely divided solid and employed as a dust. Also, such mixture may be dispersed in water with the aid of a wetting agent, and the resulting aqueous suspensions employed as sprays. In other procedures, the product may be employed as a constituent of oil-in-water emulsions of water dispersions with or without the addition of wetting dispersing or emulsifying agents. In representative operations substantially complete controls of *Fusarium oxysporum lycopersici* were obtained when 4-chlorobenzylsulfonyl fluoride was distributed in soil at a dosage of 10 parts by weight of toxicant per million parts by weight of ultimate mixture.

I claim:
4-chlorobenzylsulfonyl fluoride.

References Cited in the file of this patent
UNITED STATES PATENTS
2,711,426     Wynn _____ June 21, 1955

FOREIGN PATENTS
450,418     Germany _____ Oct. 8, 1927
762,866     Great Britain _____ Dec. 5, 1956

OTHER REFERENCES
Houben-Weyl: Methoden der Organischen Chemie, 4th ed., vol. 6, pp. 562–3 (1955).